United States Patent [19]

Nasu

[11] Patent Number: 4,946,886

[45] Date of Patent: Aug. 7, 1990

[54] SOLVENT FOR PAINT

[76] Inventor: Atsushi Nasu, 99 Katako, Youkaichiba-shi, Chiba-ken, Japan

[21] Appl. No.: 41,289

[22] Filed: Apr. 22, 1987

[30] Foreign Application Priority Data

Oct. 24, 1986 [JP] Japan ................................ 61-254069

[51] Int. Cl.⁵ .............................................. C08K 3/26
[52] U.S. Cl. .................................... 524/425; 524/433; 524/436
[58] Field of Search ........................ 524/436, 433, 425

[56] References Cited

U.S. PATENT DOCUMENTS

| | | | |
|---|---|---|---|
| 3,998,779 | 12/1976 | Baer | 524/436 |
| 4,419,137 | 12/1983 | Cayless et al. | 524/436 |
| 4,518,429 | 5/1985 | Drake et al. | 524/436 |
| 4,530,954 | 7/1985 | Arpin | 524/436 |

FOREIGN PATENT DOCUMENTS 0018738  2/1977  Japan ................................ 524/436

Primary Examiner—Joseph L. Schofer
Assistant Examiner—J. M. Reddick
Attorney, Agent, or Firm—Lorusso & Loud

[57] ABSTRACT

Novel paint solvent and paints thinned with such solvents are disclosed. In one disclosed embodiment the paint solvent is an aqueous solution containing a high concentration a strongly alkaline agent containing calcium ion as its main cation. Another solvent is disclosed which is a homogeneous blend of (a) an aqueous solution containing a high concentration a strongly alkaline agent having calcium as its main cation and (b) an an aqueous solution obtained by treating seawater with the strongly alkaline agent. The strongly alkaline agent contains at least 40% by weight calcium oxide and is a product obtained by calcining a calcium-containing natural substance such as shell, bone, limestone or mixture thereof.

17 Claims, No Drawings

SOLVENT FOR PAINT

BACKGROUND OF THE INVENTION

1. Field of the Invention

This invention relates to a paint solvent to be used at the time of application of a paint or during the manufacture of a paint, and more particularly to a solvent suitable for epoxy type paints.

2. Related Art Statement

Heretofore, various paints such as oil paints, lacquers, and coal tar based paints, more often than not, incorporated volatile solvents as thinners. As solvents for epoxy paints, toluene, lacquer-thinner, etc. have been used.

These volatile organic solvents generally have low flash points and their use incurs dangers with regard to combustion and explosion. They also have the potential of causing workers who inhale their vapors to suffer from intoxication. Toluene and lacquer-thinner, in particular, are harmful to humans. The intoxication caused by the inhalation of such vapors has been a serious problem for persons who engage in the work of painting. Further, conventional solvents are usable only in low concentrations of about 20% at most, in oil paints and epoxy paints, because higher concentrations lower the viscosity of such paints and seriously impair the coating property thereof. Such circumstances encourage such paints to be used in unduly large amounts, rendering the work of painting uneconomical.

SUMMARY OF THE INVENTION

The drawbacks attendant to the use of prior art paint solvents as described above have been successfully eliminated by the present invention.

Accordingly, an object of this invention is to provide a paint solvent, the use of which entails absolutely no danger and, even when it is used in a large amount in a paint, enables the paint to retain its inherent viscosity intact and to exhibit a highly satisfactory coating property. A further object is to provide such a solvent which is inexpensive.

To accomplish the above object the present invention provides a paint solvent in the form of an aqueous solution containing a high concentration of a strongly alkaline agent containing calcium as its principal cation.

In an embodiment suitable for epoxy type paints the solvent of the present invention includes (a) an aqueous solution containing a high concentration of a strongly alkaline agent having calcium as a principal component thereof and (b) a solution obtained by treating seawater with such a strongly alkaline agent.

In the solvents of the present invention the strongly alkaline agent contains not less than 40% by weight of calcium oxide.

The strongly alkaline agent is a product obtained by firing or calcining a calcium-containing natural substance such as shell, bone or limestone.

The first embodiment of the present invention, a thinner suitable for use with oil base paints, water base paints and lacquers, is an aqueous solution (a) having a pH value of not less than 12, preferably not less than 13.

A second embodiment, suitable for use with an epoxy paint ("solution c"), is a blend of an aqueous solution (a) and an aqueous solution (b) obtained by treating seawater. In this second embodiment both solution (a) and solution (b) will have a pH value of not less than 12, preferably not less than 13.

Other objects and features of the present invention will become apparent from the following description of the preferred embodiments thereof.

DETAILED DESCRIPTION OF PREFERRED EMBODIMENTS

The phenomenom whereby an oil paint is dissolved when it is added to an aqueous caustic soda solution and stirred has been known long in the art. Since caustic soda not only impairs the uniformity of the viscosity of the paint but also discolors the paint, however, it has been proven infeasible as a solvent for paints.

The present inventors have discovered that a calcium ion containing aqueous solution having a very high pH value is capable of dissolving oil paints as effectively as an aqueous caustic soda solution without causing discoloration of the oil paints.

More specifically, in a first embodiment, the paint solvent of the present invention is a solution obtained by dissolving a strongly alkaline agent having calcium as its main component in water to near saturation. By "main component" is meant that calcium oxide constitutes at least 40% by weight of the strongly alkaline agent.

Calcium oxide and calcium hydroxide are representative examples of preferred strongly alkaline agents. Of the two calcium compounds just mentioned, calcium oxide is used more advantageously in the present invention because it provides a higher pH value when dissolved in water than calcium hydroxide. The calcium oxide may be a product obtained by firing or calcining a natural substance of high calcium content such as shell, bone, limestone, etc. at elevated temperatures. A substance having calcium oxide as its main component is obtained by firing this natural substance at a temperature of about 1,350° C.

Table 1 shows the composition of a typical product obtained by firing limestone at 1,000° C.

TABLE 1

| component | weight % |
|---|---|
| CaO | 62.82 |
| MgO | 31.94 |
| $SiO_2$ | 0.80 |
| $R_2O_3$ | |
| ($Al_2O_3$ + $Fe_2O_3$) | 0.32 |
| $CO_3$ | 2.68 |

An alkaline agent of this type will dissolve in water in an amount providing about 0.5 to 5% by weight CaO (maximum, i.e. saturated) in solution, although the maximum will vary with the composition of the agent and the kind of water used. The aqueous solution of the agent, after removal of insolubles therefrom, is a strongly alkaline aqueous solution having a pH value of about 13.

For this strongly alkaline aqueous solution to be effectively used as a solvent for a paint, it must have a pH value of at least 12, preferably not less than 13.

When this strongly alkaline aqueous solution is added to a paint such as a water paint, a lacquer, or a coal tar base paint in an amount equal to or up to about twice the amount of the paint and stirred, there is obtained a liquid possessing a homogeneous quality and exhibiting good fluidity ("flowability") and enjoying highly satisfactory coating and covering properties.

Although the paint solvent (solvent fraction) of the first embodiment of this invention can advantageously be used in amounts 10 to 30%, by weight based on the amount of a paint being dissolved, i.e. amounts in which conventional paint solvents are used, it is used more advantageously in an amount of at least 100%, based on the amount of the paint (paint fraction). With the coating material obtained by adding the paint solvent of this invention to a given paint, therefore, the paint content can be decreased to less than half that which is required for the conventional coating material and the thickness applied of this coating material need not be unduly increased. Thus, use of a coating material or paint in accordance with the present invention avoids the otherwise possible occurrence of cracks in the applied coating due to excessive thickness.

If the paint solvent of the first embodiment of this invention is added to a paint in an amount more than twice the amount of the paint, the liquid thus produced has such a high viscosity that, in its unmodified form, it possesses poor covering capability and lacks practical utility in coating work using a brush or a spray.

The paint of the present invention (solvent fraction and paint fraction) may be used in combination with a very small amount, about 0.5% of an organic solvent, such as thinner or gasoline, to optimize the viscosity of the agent/paint blend.

The amount of the strongly alkaline aqueous agent (solvent fraction) to be added to the paint fraction and the amount of thinner to be incorporated for adjustment of viscosity will vary and are selected so as to suit the conditions under which the coating is applied, e.g. temperature, nature of the substrate, etc.

The first embodiment of the present invention described above, i.e. the aqueous solution (a) containing a high concentration the strongly alkaline agent having calcium ion as its predominant cation, exhibits highly desirable miscibility and spreading ("flowability") characteristics when mixed with paints such as oil paints, water paints, and lacquers. Unfortunately, a paint solvent, in accordance with the first embodiment, i.e. "solution (a)", is disadvantageous for use with epoxy paint, because it impairs the homogeneity of the paint.

The inventors, long interested in the various actions and properties of ions in seawater, have continued to search for practical utilities for use of sea water. It has now been discovered that a solution obtained by treating seawater with the strongly alkaline agent used in the first embodiment described above lends itself to use in a thinner for epoxy type paints. Thus, in a second embodiment, the present invention provides a paint solvent including (a) an aqueous solution of a strongly alkaline agent containing calcium as its predominant cation and (b) a solution obtained by treating seawater with the aforementioned strongly alkaline agent.

The solvent of this second embodiment finds use mainly with epoxy paints.

Solution (a) of the second embodiment is substantially the same as the paint solvent of the first embodiment. Thus, "solution a" of the second embodiment is an aqueous solution obtained by dissolving in water a strongly alkaline agent having calcium as a principal component thereof, i.e. calcium is the predominant cation, preferably a strongly alkaline agent containing not less than 40% by weight of calcium oxide. Most preferably an alkaline "solution (a)" has a pH value of not less than 13. For adjustment of pH, soda (sodium hydroxide is dissolved in the aqueous solution (a) in a concentration of 1% or less (0.1 to 1.0%), preferably about 0.5%, based on the amount of the aqueous solution. An epoxy paint can be easily dissolved in such an aqueous solution (a). If the amount of sodium hydroxide added exceeds 1%, the quick-drying property of the paint is impaired to an intolerable extent.

Solution (b) of the second embodiment is also formed with a strongly alkaline agent containing not less than 40% of calcium oxide, similar to that used to form the strongly alkaline aqueous solution (a). Again, such an alkaline agent is produced by burning or calcining a natural substance such as shell, bone, or limestone which contains calcium in a high concentration. A solution (b) is obtained by adding the resultant lime-containing product in an amount of about 10–50 g/liter to seawater, stirring, and then removing insolubles from the resulting mixture.

The amount of the strongly alkaline agent is not necessarily limited to the range of 10 to 50 g/liter. Preferably, the amount required is only that necessary to give the resultant solution, after removal of insolubles a pH value of not less than 13. Generally, this requirement is fulfilled by an amount in the neighborhood of 30 g/liter. If the strongly alkaline agent is added in an excess amount, the excess portion will simply remain present as insolubles.

The paint solvent of the second embodiment, "solution (c)" is obtained by mixing the "solution (b)", obtained by the treatment of seawater as described above with the aqueous "solution (a)" of the strongly alkaline agent at a volumetric ratio of (b):(a) of about 2:8 to about 8.2, preferably 4:5 to about 5:4.

This paint solvent (c) is strongly alkaline with a pH exceeding 13 and is capable of readily dissolving not only oil paints but also epoxy paints.

When solution (c) of the second embodiment and an epoxy point are mixed in roughly equal amounts, there is obtained a point possessing highly desirable spreading and covering properties A small amount may be added to adjust the viscosity of the paint solvent. In this case, the additional solvent can be used in an amount up to about twice the amount of the paint. In any event, the quick drying property of the resultant paint is entirely the same as when toluene or lacquer thinner alone is used in the paint.

These solvents contemplated by this invention are not volatile because they are aqueous in nature. They are, therefore, harmless to humans and their use creates no danger of combustion or explosion.

Even when these solvents are used in a large amount (100%–200%) with a paint fraction, the resultant thinned paint blend will have a suitable viscosity for application to most surfaces. By adding these solvents in a fairly larger amount than that for a conventional solvent, therefore, there can be obtained a proportional saving in the amount of the paint fraction.

Further, the solvents according to this invention are phenomenally cheap because they use, as a raw material, a substance such as shell, bone or limestone which are all obtainable at a nominal price.

Moreover, the solvents of the present invention increase the alkalinity of the paint because they are themselves strongly alkaline. A paint mixed with these solents, therefore, acquires increased alkalinity and a coating of the paint exhibits an improved antioxidant effect and enjoys enhanced durability.

Further, solution c of the present invention possesses no toxicity, excels in coating and quick drying properties, and joys a very high practical value and, therefore, can take the ace of such harmful solvents as toluene and lacquer thinner on which epoxy paints have had to rely in the past.

EXAMPLE (a) Aqueous solution (a) of a strongly alkaline agent:

An aqueous solution (a) having a pH value of 13.0 was obtained by adding 16 g of a strongly alkaline agent to 1 liter of water and removing insolubles from the resultant solution. The strongly alkaline agent used herein was a powdery agent obtained by combining fired limestone, 10% kerosene, based on the amount of the fired limestone, and a small amount of water.

(b) Solution (b) resulting from treatment of seawater with a strongly alkaline agent:

A solution (b) having a pH value of 13.0 was obtained by adding 12 g of the aforementioned powdery alkaline agent to 1 liter of seawater, mixing by agitation, and removing insolubles from the resultant solution.

The aqueous solution (a) and the solution (b) were mixed in ratios 1:4, 1:1, and 4:1 and the resultant mixtures were used as solvents for a paint. The results were as shown in the following table.

TABLE

|  | Example | | | Comparative experiment | | |
|---|---|---|---|---|---|---|
|  | 1 | 2 | 3 | 1 | 2 | 3 |
| Epoxy paint | 50 | 50 | 50 | 50 | 50 | 50 |
| Solution (a) | 10 | 25 | 40 | — | 75 | — |
| Seawater (b) | 40 | 25 | 10 | 50 | — | — |
| Seawater (b) (pH 11.5) | — | — | — | — | — | 50 |
| Compatibility | ◉ | ◉ | ○ | △ | × | ○ |
| Discoloration (browning) | No | No | No | No | — | Yes |
| Viscosity | Good | Good | Good | Solid | — | Good |
| Quick drying property | ○ | ○ | ◉ | △ | — | △ |

◉ Superior
○ Good
△ Inferior
× No

Thus, there is provided in accordance with the present invention paint solvents which have the advantages discussed above The embodiments described above are intended to be purely illustrative, not limitative, of the invention and persons of ordinary skill in the art, therefore, may make variations and modifications thereof without departing from the spirit and scope of the invention. All such variations and modifications are intended to be within the scope of the appended claims.

We claim:

1. A paint comprising a solvent fraction and a paint fraction dissolved in said solvent fraction, said solvent fraction comprising an aqueous solution of an alkaline agent, the cations of said alkaline agent being predominantly calcium ions and present in an amount sufficient to provide a pH of at least 12, said paint fraction being a member selected from the group consisting of oil-base paints, aqueous latex paints, lacquers, epoxy paints and coal tar-base paints.

2. A paint in accordance with claim 1 wherein said aqueous solution comprises seawater and said paint fraction is an epoxy paint.

3. A paint in accordance with claim 2 wherein said solvent fraction is formed by admixing:
   (a) an aqueous solution of an alkaline agent, the cations of said alkaline agent being predominantly calcium ions and present in an amount sufficient to make the pH of said solution at least 12; and
   (b) an aqueous solution obtained by dissolving said alkaline agent in seawater in an amount sufficient to make the pH of said seawater at least 12.

4. A paint in accordance with claim 1 wherein said paint fraction is an oil-base paint.

5. A paint in accordance with claim 1 wherein said paint fraction is an aqueous latex paint.

6. A paint in accordance with claim 1 wherein said paint fraction is a lacquer.

7. A paint in accordance with claim 1 wherein said paint fraction is a coal-tar base paint.

8. A paint in accordance with claim 1 wherein said alkaline agent is at least 40% by weight calcium oxide.

9. A paint in accordance with claim 1 wherein said solvent fraction has a pH of at least 13.

10. A paint in accordance with claim 1 wherein said solvent fraction is at least 10% by weight of said paint.

11. A paint in accordance with claim 1 wherein said solvent fraction is at least 50% by weight of said paint.

12. A paint in accordance with claim 1 wherein said alkaline agent is a product obtained by calcining a calcium-containing natural substance selected from the group consisting of shell, bone, limestone and mixtures thereof.

13. A paint in accordance with claim 3 wherein said aqueous solution (a) and said aqueous solution (b) each have a pH of at least 13.

14. A paint in accordance with claim 2 wherein said alkaline agent is a product obtained by calcining a calcium-containing natural substance selected from the group consisting of shell, bone, limestone and mixtures thereof.

15. A paint in accordance with claim 2 wherein said alkaline agent is at least 40% by weight calcium oxide.

16. A paint in accordance with claim 1 wherein said solvent fraction is at least 10% by weight of said paint.

17. A paint in accordance with claim 1 wherein said solvent fraction is at least 50% by weight of said paint.

* * * * *

UNITED STATES PATENT AND TRADEMARK OFFICE
CERTIFICATE OF CORRECTION

PATENT NO. : 4,946,886
DATED : August 7, 1990
INVENTOR(S) : Atsushi NASU

It is certified that error appears in the above-identified patent and that said Letters Patent is hereby corrected as shown below:

Col. 4, line 38, "point" should read --paint--.

Col. 5, line 1, "joys" should read --enjoys--;

line 2, "ace" should read --place--;

line 37, 3rd column of the table, under "Example 2", --O-- should read --⊙--; and line 45, after "above" insert a period --.--.

Signed and Sealed this

Twenty-fourth Day of December, 1991

Attest:

HARRY F. MANBECK, JR.

Attesting Officer     Commissioner of Patents and Trademarks